G. C. DILL.
METERING SWITCH.
APPLICATION FILED MAY 3, 1915.

1,184,834.

Patented May 30, 1916.
2 SHEETS—SHEET 1.

WITNESSES:
Fred. A. Lind.
J H Procter

INVENTOR
George C. Dill
BY
Wesley G. Carr
ATTORNEY

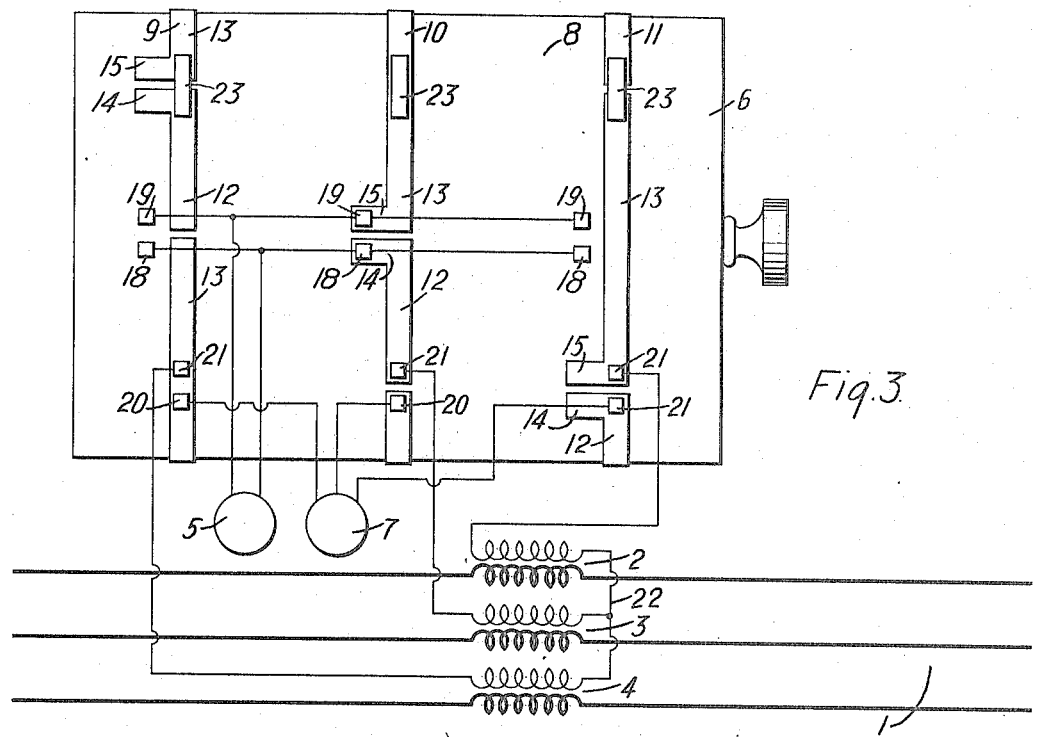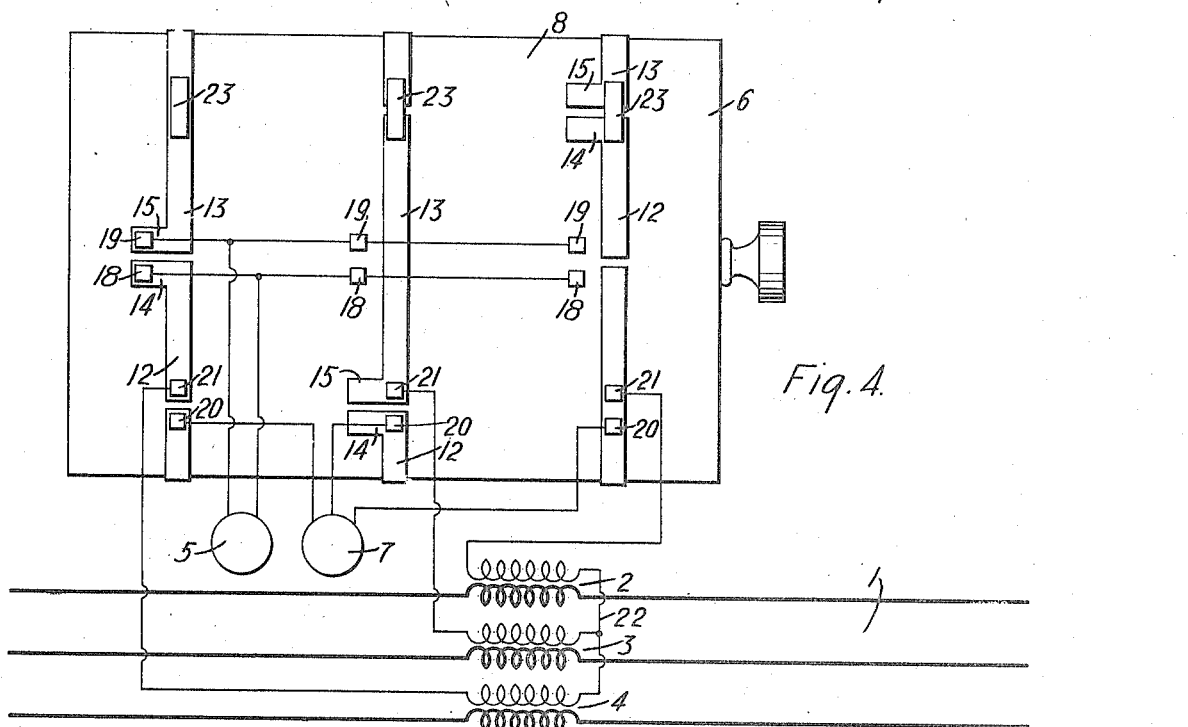

UNITED STATES PATENT OFFICE.

GEORGE C. DILL, OF WILKINSBURG, PENNSYLVANIA, ASSIGNOR TO WESTINGHOUSE ELECTRIC AND MANUFACTURING COMPANY, A CORPORATION OF PENNSYLVANIA.

METERING-SWITCH.

1,184,834.

Specification of Letters Patent.   Patented May 30, 1916.

Application filed May 3, 1915.   Serial No. 25,506.

*To all whom it may concern:*

Be it known that I, GEORGE C. DILL, a citizen of the United States, and a resident of Wilkinsburg, in the county of Allegheny and State of Pennsylvania, have invented a new and useful Improvement in Metering-Switches, of which the following is a specification.

My invention relates to switches or controllers and particularly to such switches as are adapted to change the connections of a single ammeter or other measuring instrument with respect to various sources of electric current.

One object of my invention is to provide a switch or controller that may be utilized to change the connection between a measuring instrument and several sources of electric current.

Another object of my invention is to provide a switch of the above indicated character that may be disposed between the instrument transformers and other instruments that also receive their current from the instrument transformers.

Heretofore, when instrument transformers supplied current to other devices as well as to ammeters, the ammeter switch had to necessarily be located at such a place that the current traversed the other devices before it traversed the windings of the ammeter. I provide a switch or controller that will permit the ammeter to be connected in such positions that the current which traverses the same may traverse any number of instruments after it has traversed the windings of the ammeter.

Figure 1:
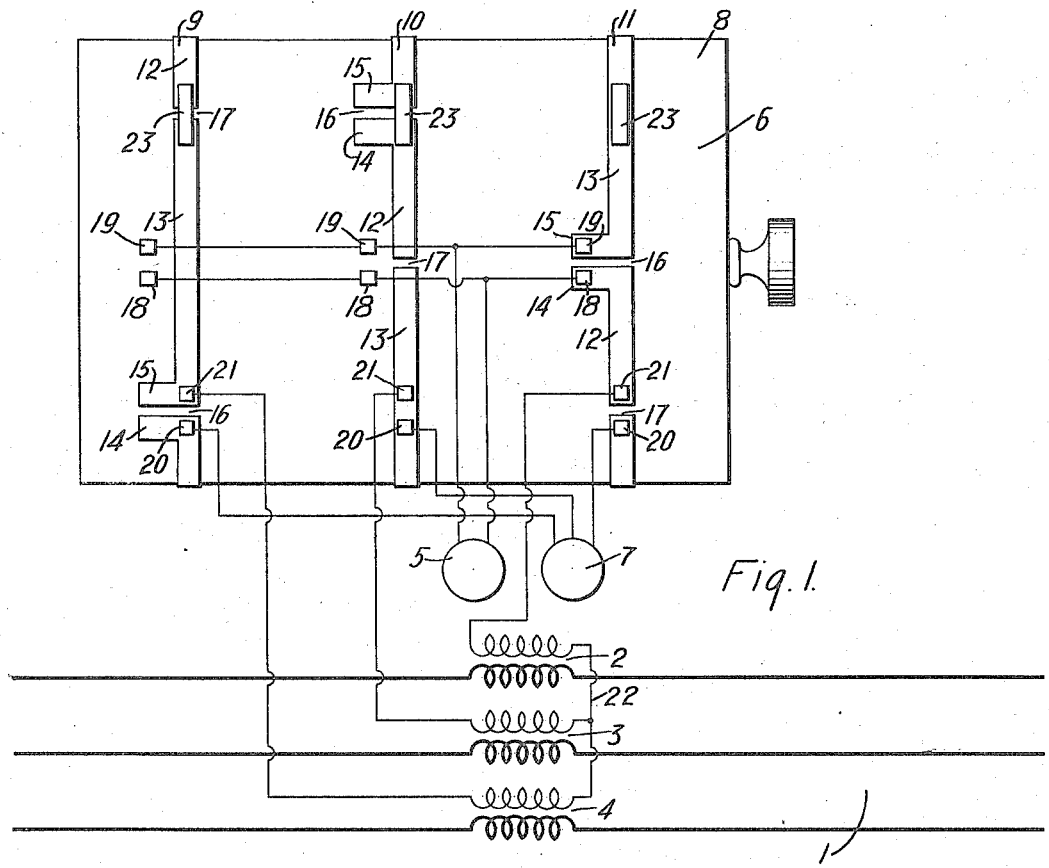
Figure 2:
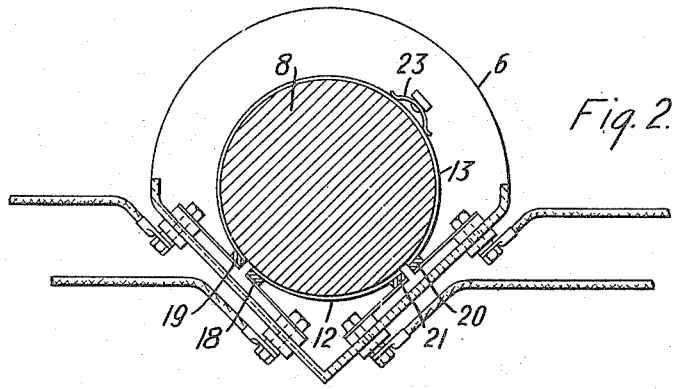

In the accompanying drawings, Figure 1 is a diagrammatic representation of the development of a switch or controller illustrating the connections of the same in the carrying out of my invention; Fig. 2 is an end view, partially in elevation and partially in section, of a switch or controller embodying my invention, and Figs. 3 and 4 are diagrammatic developments of the switch embodying my invention, illustrating connections of the same in two different operating positions.

A polyphase electrical circuit 1 is provided with three current transformers 2, 3 and 4. In order to determine, with a single measuring instrument, the current that traverses each of the several transformers, I provide an ammeter 5 and a switch or controller 6. The switch 6, which embodies my invention, is so constructed that the current that traverses the winding of the ammeter 5 may also traverse any number of electrical measuring instruments 7, irrespective of the phase in which the ammeter 5 is connected.

The switch 6 comprises a drum 8 of some insulating material upon which are disposed, in the case of a three-phase circuit, three units 9, 10 and 11. Each of the so-called units comprises a pair of conducting segments 12 and 13 having lateral extensions 14 and 15 thereon and separated by insulating spacers or air gaps 16 and 17. Three pairs of stationary contact-terminal members 18 and 19 are adapted to engage the lateral extensions 14 and 15 of the several units 9, 10 and 11. The contact members 18 and 19 are connected to the respective terminals of the ammeter 5. Three pairs of stationary contact-terminal members 20 and 21 engage the respective conducting segments of the units 9, 10 and 11. The stationary contact-terminal members 21 are connected to the respective terminals of the secondary windings of the transformers 2, 3 and 4, the other terminals of which are connected together by a conductor 22. The stationary contact-terminal members 20 are connected to the respective terminals of the electrical measuring instrument 7. Bridging contact members 23 are provided to engage the conducting segments 12 and 13 and are so disposed as to prevent the ammeter 5 from being open-circuited at any time.

In Fig. 1 of the drawings, the switch 6 is in such position that the ammeter 5 is supplied with current from the transformer 2. In this position of the switch, current traverses the secondary winding of the transformer 2, the stationary contact member 21, the conducting segment 12, the projection 14 and the stationary contact member 18 of the unit 11, the ammeter 5, the stationary contact member 19, the projection 15, the conducting segment 13 and the stationary contact member 20 of the unit 11 to the measuring instrument 7 where it divides, one path comprising one winding of the measuring instrument 7, the stationary contact member 20, the conducting segment 12, the bridging member 23, the conducting segment 13 and the stationary contact member 21 of the unit 9 and the secondary winding of the transformer 4, and the other path comprising a second winding of the instrument 7, the stationary contact member 20, the conducting segment 13, the stationary contact member 21 and the secondary winding of the transformer 3. It will thus be seen that current traverses the ammeter 5 and also the windings of the instrument 7 when the switch is in the position shown in Fig. 1 of the drawings.

If it is desired to determine the value of the current traversing the transformer 3, the switch 6 is turned to the position shown in Fig. 3 of the drawings. In this position of the switch, current traverses the secondary winding of the transformer 3, the stationary contact member 21, the conducting segment 12, the projection 14, the stationary contact member 18 of the unit 10, the ammeter 5, the stationary contact member 19, the projection 15, the conducting segment 13 and the stationary contact member 20 of the unit 10, to the instrument 7 where it divides, one part traversing one winding of the instrument 7, the stationary contact member 20, the conducting segment 13 and the stationary contact member 21 of the unit 9 to one terminal of the secondary winding of the transformer 4 and the other part traversing a second winding of the measuring instrument 7, the stationary contact member 21, the conducting segment 12, the bridging member 23, the conducting segment 13 and the stationary contact member 21 of the unit 11 to one terminal of the secondary winding of the transformer 2.

If the drum 6 is turned to the position shown in Fig. 4, the current that traverses the secondary winding of the transformer 4 will traverse the ammeter 5 and the two windings of the measuring instrument 7, substantially in the manner described with respect to Figs. 1 and 2. It will be understood that the bridging member 23 is so disposed that the air gaps 16 and 17 are bridged at such times as are necessary to prevent open-circuiting the ammeter 5. This is done for the obvious reason of preventing the detrimental effects of open-circuiting the secondary winding of a current transformer.

While I have shown my invention in connection with an ammeter for measuring the current in the several phases of a polyphase electric circuit, it may be used for connecting a direct-current measuring instrument to various sources of electric current and in numerous other applications without departing from the spirit and scope of my invention, as set forth in the appended claims.

I claim as my invention:

1. The combination with a plurality of measuring instruments, of a switch comprising two conducting segments having lateral extensions, and air gaps therebetween, two terminal members for engaging the said segments, two terminal members for engaging the lateral extensions, the last mentioned terminal members being connected to the respective terminals of one of the said instruments, and means for bridging the gaps between the conducting segments.

2. A switch comprising two conducting segments severally having a lateral extension and insulated from each other, two terminal members for engaging the said segments, two terminal members adapted to engage the lateral extensions and a bridging member adapted to bridge the intervening space between the segments under predetermined conditions.

3. A switch comprising two conducting segments disposed end-to-end upon a drum and separated by air gaps, said conducting segments severally having a lateral extension on each side of one of the air gaps, terminal contact members for engaging the said segments and means for bridging one of the air gaps under predetermined conditions.

4. A switch comprising an insulated cylinder, a plurality of conducting segments arranged upon the cylinder in three units, each unit comprising two conducting segments, the openings between the segments of each unit being displaced 120° with respect to the openings in the other units, said conducting segments having lateral projections thereon, contact members for engaging the segments and the lateral projections and bridging means for bridging the opening between the segments under predetermined conditions.

5. A switch for connecting an ammeter in various phases of a polyphase circuit and also in circuit with other measuring instruments comprising a drum, a plurality of pairs of conducting segments disposed on the drum and having lateral projections thereon, the openings between the said pairs of segments being equally displaced around the said drum, contact terminals for engaging the said lateral projections, said contact terminals being connected to the respective terminals of the ammeter, a pair of terminal contact members for each pair of segments, one terminal of each of the said pairs being connected to the respective terminal of the source of current and the other terminals being connected to the respective terminals of the other measuring instruments and a bridging member for each pair of segments so disposed as to prevent open circuiting the ammeter.

6. A switch comprising conducting segments disposed in end-to-end relation with a space therebetween, each of the said segments having a lateral projection thereon, terminal members respectively engaging the said segments and the said projections and a bridging member for bridging the space between the segments under predetermined conditions.

In testimony whereof, I have hereunto subscribed my name this 27th day of April, 1915.

GEORGE C. DILL.